(12) United States Patent
Barnett et al.

(10) Patent No.: US 7,381,932 B2
(45) Date of Patent: Jun. 3, 2008

(54) QUASI-OPTICAL MATERIAL TREATMENT APPARATUS

(75) Inventors: Larry Roger Barnett, Hsinchu (TW);
Kwo Ray Chu, Hsinchu (TW);
Tsun-Hsu Chang, Hsinchu (TW);
Hung-I Chang, Hsinchu (TW);
Wei-Yuan Chiang, Hsinchu (TW);
Ching-Fang Yu, Hsinchu (TW);
Ling-Chieh Tai, Hsinchu (TW);
Syh-Yuh Cheng, Hsinchu (TW);
Chwung-Shan Kou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 359 days.

(21) Appl. No.: 11/109,773

(22) Filed: Apr. 20, 2005

(65) Prior Publication Data
US 2006/0144832 A1 Jul. 6, 2006

(30) Foreign Application Priority Data
Dec. 31, 2004 (TW) .............................. 93141643 A

(51) Int. Cl.
*H05B 6/64* (2006.01)
*H05B 6/78* (2006.01)

(52) U.S. Cl. .................. 219/679; 219/700; 219/738; 219/756; 219/762

(58) Field of Classification Search ........ 219/678–679, 219/699–701, 736–738, 756, 762
See application file for complete search history.

(56) References Cited

U.S. PATENT DOCUMENTS

| | | | | | |
|---|---|---|---|---|---|
| 2,463,569 | A | * | 3/1949 | Smith | 250/494.1 |
| 2,943,174 | A | * | 6/1960 | Parker | 219/686 |
| 3,281,727 | A | * | 10/1966 | Niebuhr et al. | 333/99 R |
| 3,626,838 | A | * | 12/1971 | Gorakhpurwalla | 426/243 |

OTHER PUBLICATIONS

Industrial Material Magazine, Dec. 2004, pp. 77-80.

* cited by examiner

*Primary Examiner*—Philip H. Leung
(74) *Attorney, Agent, or Firm*—Birch, Stewart, Kolasch & Birch, LLP

(57) ABSTRACT

A quasi-optical material treatment apparatus includes a first mirror and a second mirror. The first mirror is arched, and has a focal point in a chamber distance, and a coupling port to receive a high power microwave from an external microwave source that travels along the chamber distance to output a strong field microwave beam. The second mirror and the first mirror jointly form a quasi-optical action chamber and are movable relative to each other to adjust the total chamber distance between the two. A material to be treated may be moved through a focusing zone (about one wavelength of the strong field microwave beam) of the strong field microwave beam to be treated rapidly and evenly.

11 Claims, 5 Drawing Sheets
(2 of 5 Drawing Sheet(s) Filed in Color)

QUASI-OPTICAL MATERIAL TREATMENT APPARATUS

FIELD OF THE INVENTION

The invention relates to a quasi-optical material treatment apparatus, and particularly to a quasi-optical material treatment apparatus that moves the material to be treated through a focusing zone of a strong field microwave beam to rapidly and evenly process heat treatment of the material.

BACKGROUND OF THE INVENTION

The conventional laser optical resonator consists of two spherical mirrors or a spherical mirror and a plane mirror with dimensions about one hundred thousand times of that of the wavelength. The microwave quasi-optical resonator also adopts the same structure and principle. However, because the wavelength is much greater than the optical wavelength, the dimensions of the chamber are only a dozen or a few dozen times the wavelength. Hence it is called a quasi-optical resonator.

Heating by microwave, compared with radiation heating by a conventional high temperature furnace, has many advantages, such as instant penetration, fast heating speed, short action time and saving of energy. Hence it is gradually becoming accepted and increasingly popular. The present microwave action chambers are made in various forms. But the main body of the system generally adopts a closed resonator. Material is heated in an electromagnetic wave field in a microwave mode.

The present closed resonator has three limitations when in use: 1. the dimension of the material is limited by the size of the resonator; 2. the electromagnetic wave field in the microwave mode is not uniform, which results in uneven treatment of the material; and 3. the field is distributed over the entire chamber, which limits the heating speed.

Because of the aforesaid limitations, the conventional closed resonator cannot meet the material treatment requirements of new material developments and technologies. For instance, electronic textile that contains deformable electronic modules is one focus of future technologies. Such products have a large area, and the modules have materials withstanding different-temperature material treatment that cannot be supported by the manufacturing process proceeding at the same temperature. Hence a strong absorption layer that can be heated quickly and locally is required in the development of a new technique to bond a functional layer and the substrate material of a lower melting point. The present closed microwave resonator and the conventional thermal radiation heating chamber cannot meet the requirements of those new materials and manufacturing processes. Therefore a new action chamber has to be developed to meet those requirements.

SUMMARY OF THE INVENTION

In view of the aforesaid problems, the primary object of the invention is to provide a quasi-optical material treatment apparatus that can move the material to be treated through a focusing zone of a strong field microwave beam to rapidly and evenly process heat treatment for the material.

In order to achieve the foregoing object, the quasi-optical material treatment apparatus of the invention includes a first mirror and a second mirror. The first mirror is arched and has a focal point in the chamber distance. The first mirror further has a coupling port to receive a high power microwave from an external microwave source that travels along the chamber distance to output a strong field microwave beam. The second mirror and the first mirror jointly form a quasi-optical action chamber and are movable relative to each other to adjust the total chamber distance between the two. The material to be treated is moved through the focusing zone (about one wavelength of the strong field microwave beam) of the strong field microwave beam to receive heat treatment rapidly and evenly.

The quasi-optical action chamber formed by the first mirror and the second mirror according to the invention has a higher quality factor value and stronger focusing power, hence the material to be treated can be treated in the focusing zone of strong field. Heating speed is much faster than the conventional high temperature furnace and the closed microwave action chamber.

The foregoing, as well as additional objects, features and advantages of the invention will be more readily apparent from the following detailed description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the office upon request and payment of the necessary fee.

DESCRIPTION OF THE PREFERRED EMBODIMENTS

Figure 1:
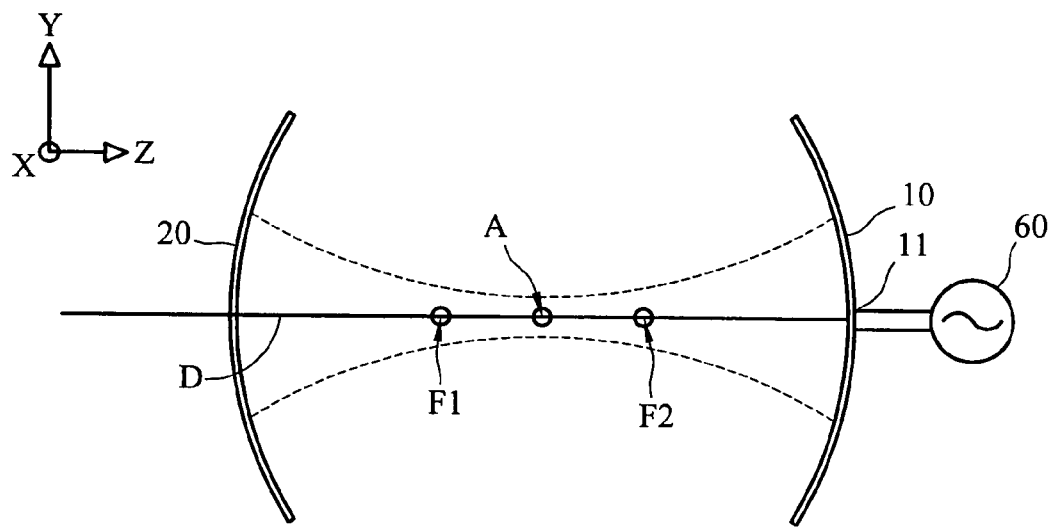
FIG. 1 is a schematic view of the structure of a quasi-optical action chamber consisting of two arched mirrors.

Refer to FIG. 1 for a quasi-optical action chamber that consists of two arched mirrors. There is an arched first mirror 10 that has a first focal point F1 located in the chamber distance D and a coupling port 11 to receive a high power microwave from an external microwave source 60 formed in a horn-shaped antenna. The high power microwave travels along the chamber distance D (the Z axis shown in the drawing) to output a strong field microwave beam, which forms a Guassian distribution in X-Y directions shown in the drawing. There is also an arched second mirror 20 that has a second focal point F2 in the chamber distance D. The first mirror 10 and the second mirror 20 jointly form the quasi-optical action chamber, and are movable relative to each other to adjust the total length of the chamber distance D of the two to get a focusing zone A.

In addition, when the first focal point F1 of the first mirror 10 and the second focal point F2 of the second mirror 20 are coincided, the diameter of the focusing zone A is at its minimum (about one wavelength of the strong field microwave beam). Moreover, when the first mirror 10 and the second mirror 20 are moved close to each other, the size of focusing zone A increases. When the first mirror 10 and the second mirror 20 are moved away from each other, the strong field microwave beam becomes unstable. By adjusting the chamber distance D of the first mirror 10 and the second mirror 20, the chamber distance D may be controlled to about one wavelength of the strong field microwave beam to be proximate to the size of the first mirror 10 and the second mirror 20. Hence in the action chamber formed by the first mirror 10 and the second mirror 20, the heating area may be adjusted according to the characteristics of the material M to be treated (referring to FIG. 2) to correspond to different wave absorption coefficients and areas (sizes) of the material to be treated. The polarized direction of the wave of the strong field microwave beam may also be controlled by adopting a composite mirror assembly.

As shown in the drawing, when the focusing zone A of the strong field microwave beam is located at the center of the first mirror 10 and the second mirror 20, the chamber distance D is at its minimum and the field is at its maximum. When the strong field microwave beam is located on the first mirror 10 and the second mirror 20, the field is significantly weaker. In the condition of the same total field energy, the ohm loss of the first mirror 10 and the second mirror 20 is much less than the wall of the conventional resonator. The value of system quality factor is much greater, about 10-1000 times that of the conventional closed resonator.

As the first mirror 10 and the second mirror 20 are formed in an arched shape, the curvature of the mirror may be optimized to generate an even field in the X-Y directions shown in the drawing. This is more desirable for industrial applications, such as processing chips of a special dimension. For researching small samples, the first mirror 10 and the second mirror 20 may be changed to spherical mirrors to achieve the optimal result. Take an example of a microwave with a power of 1000 watts and frequency of 35 GHz. When the chamber distance D is regulated to its minimum, the maximum power absorbed by the treated material M can reach 1000 watts/cm$^2$. This is proximate to the thermal conductive capability of pure copper. With the focusing zone regulated between 2 and 10 cm, the power absorbed by the treated material M may be controlled between 250 and 10 watts/cm$^2$. This is a desired range to heat material of a low wave absorption coefficient or rapidly heat material of a high wave absorption coefficient.

Figure 2:
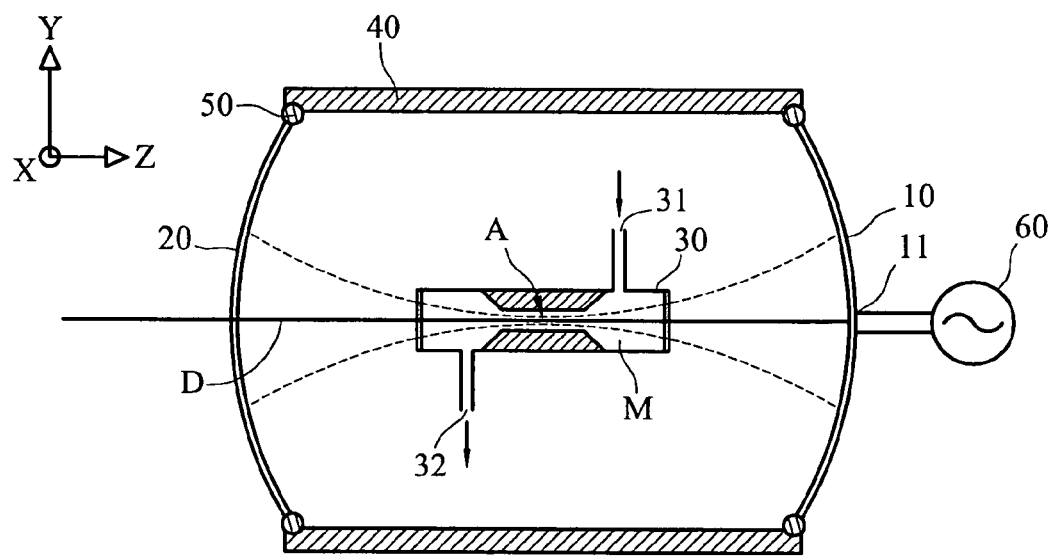
FIG. 2 is a schematic view of the structure of a first embodiment of the invention.

Refer to FIG. 2 for a first embodiment of the quasi-optical material treatment apparatus of the invention. It has another housing chamber 30 that has a microwave inlet 31 on one end and a microwave outlet 32 on another end to treat a carrying material M in powders. The housing chamber 30 is located in a focusing zone A and has a long axis located in the chamber distance D. The microwave inlet 31 and the microwave outlet 32 are located on a weak field location to reduce thermal loss. The chamber 30 has a width matching the boundary of the strong field microwave beam to force the material to be treated M to pass through the focusing zone A. The microwave inlet 31 and the microwave outlet 32 may be made from quartz of a low wave absorption coefficient. However, if the microwave inlet 31 and the microwave outlet 32 are remote from the high field strong zone, other non-quartz materials that are not sensitive to microwave may also be used, such as ceramics or Teflon. To prevent reflection, the window thickness of the microwave inlet 31 and the microwave outlet 32 is an integer of the half-wavelength of the strong field microwave beam.

To prevent most of the strong field microwave beam from leaking out of the apparatus of the invention, a microwave shield 40 may be added to cover the gap between the first mirror 10 and the second mirror 20. The gap between the shield 40 and first mirror 10, and between the shield 40 and the second mirror 20 may be padded by a wave absorbing element 50 (or a wave-resistant structure) to prevent the strong field microwave beam from leaking out.

Hence in the first embodiment the material to be treated M in powder form may be loaded into the chamber 30 through the microwave inlet 31, and unloaded through the microwave outlet 32. When the material to be treated M passes through the focusing zone A of the strong field microwave beam of the chamber distance D, the material M is treated as desired.

The first mirror 10 and the second mirror 20 in the first embodiment may be substituted by spherical mirrors.

The quasi-optical action chamber formed by the first mirror 10 and the second mirror 20 has a higher quality factor value and stronger focusing power. Hence when the material M is treated in the focusing zone A of a stronger high field, the heating speed is much faster than heating in the conventional high temperature furnace or closed microwave action chamber.

Moreover, the quasi-optical action chamber has another advantage, namely that the material to be treated M can continuously pass through the open space between the first mirror 10 and the second mirror 20. Thus the quantity of the material to be treated M is not restricted by the size of the quasi-optical resonator.

Figure 3:
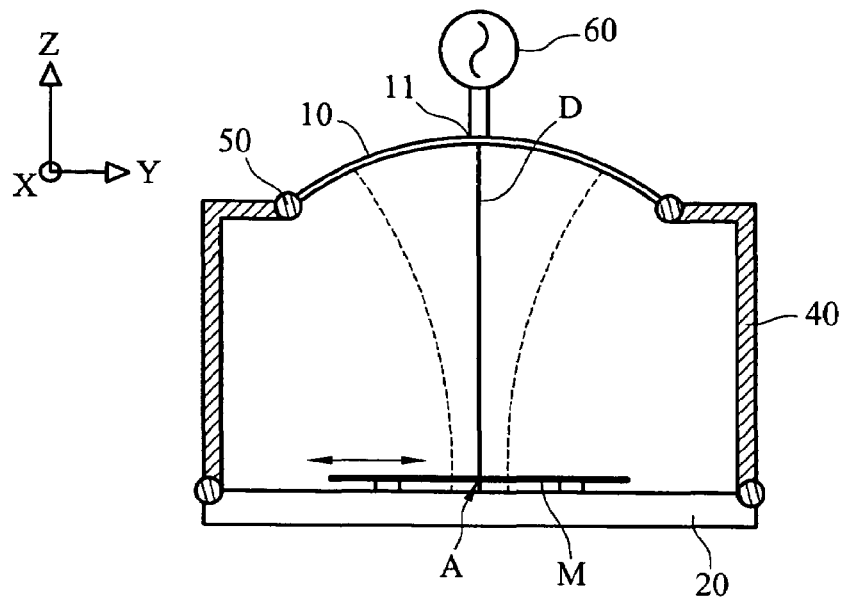
FIG. 3 is a schematic view of the structure of a second embodiment of the invention.

Refer to FIG. 3 for a second embodiment of the invention. It mainly includes a first mirror 10 and a second mirror 20. The first mirror 10 is arched, and has a focal point F1 in the chamber distance D, and a coupling port 11 to receive a high power microwave from an external microwave source formed in a horn-shaped antenna. The microwave passes through the coupling port 11 along the chamber distance D (the Z axis shown in the drawing) to output a strong field microwave beam, which forms a Gaussian distribution in the X-Y directions. The second mirror 20 is a plane mirror abutting a focusing zone A of the chamber distance D. The plane second mirror 20 can hold the material to be treated M (such as semiconductor chips, dielectric materials or the like) in a movable manner to pass through the focusing zone A of the strong field microwave beam to receive heat treatment rapidly and evenly. The first mirror 10 and the second mirror 20 jointly form a quasi-optical action chamber, and are movable relative to each other to adjust the total length of the chamber distance D between them to form the focusing zone A.

To prevent most of the strong field microwave beam from leaking out of the apparatus of the invention, a microwave shield 40 may be added to cover the gap between the first mirror 10 and the second mirror 20. The gap between the shield 40 and the first mirror 10, and between the shield 40 and the second mirror 20 may be padded by a wave absorbing element 50 (or a wave-resistant structure) to prevent the strong field microwave beam from leaking out.

Hence in the second embodiment the plane material M may be movably held on the second mirror 20. When the material M passes through the focusing zone A of the strong field microwave beam of the chamber distance D, the material M is treated as desired. In the second embodiment, the ohm loss is greater than the first embodiment, but the quality factor value is still high. During operation, the material to be treated M is loaded onto the second mirror 20. The area of the focusing zone A is controlled by adjusting the elevation of the first mirror 10, and the material to be treated M is movable in two dimensions on the X-Y axis. The material to be treated M may be positioned on any location of the invention in different manners to achieve the optimal efficiency of energy absorption. In other words, as the electric field of the focusing zone A is parallel with the first mirror 10, the pure dielectric material that is formed in a plane fashion is preferably positioned in the same direction as the second mirror 20, while the dielectric material attached to a metal substrate is preferably positioned vertical to the second mirror 20.

Figure 5:
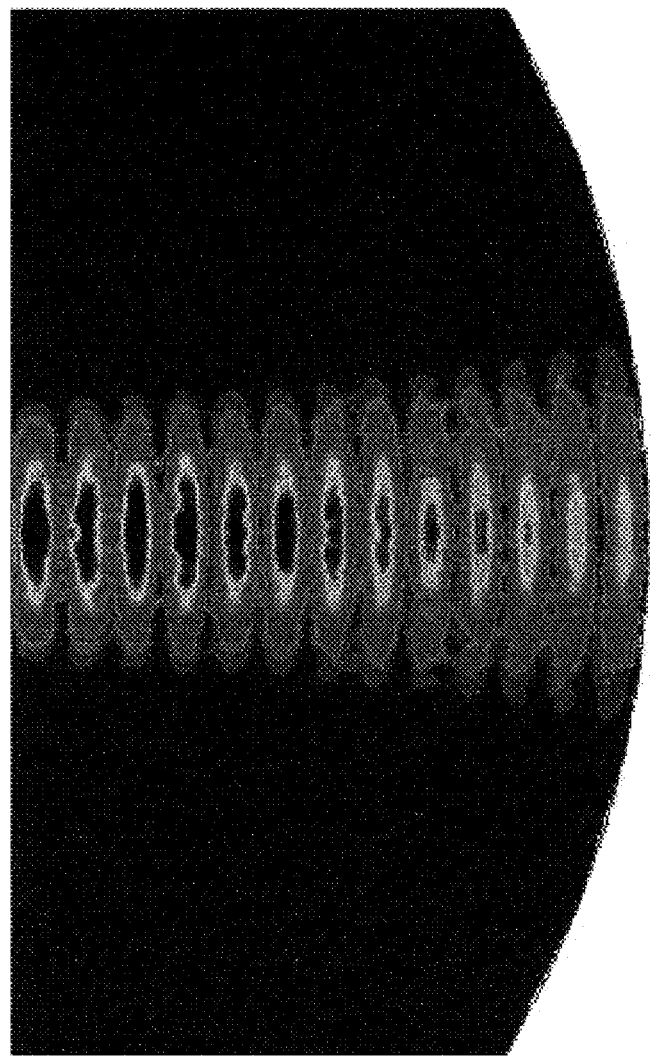
FIG. 5 is a schematic view of the invention in a simulated condition.

Refer to FIG. 5 for the invention in a simulated condition. The first mirror 10 is spherical with a curvature radius of 10 cm and diameter of 10 cm. The picture shows a field profile of a $TEM_{0,0,13}$ mode, at a frequency of 34.6 GHz. Although the size of the quasi-optical action chamber formed by the first mirror 10 and the second mirror 20 is relative small, the quality factor value is 25,439. As shown in the drawing, the strong field microwave beam focuses on the second mirror 20, and the interval at the peak field is one half the wavelength of the strong field microwave beam.

Figure 6:
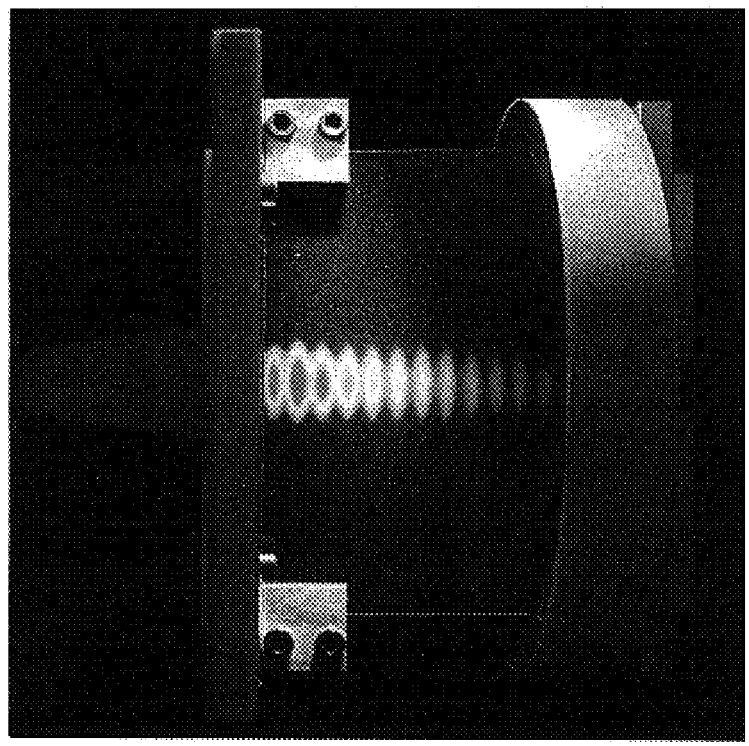
FIG. 6 is a schematic view of the invention in an experiment condition.

FIG. 6 shows an experiment condition of the invention. The first mirror 10 has a curvature radius of 14.1 cm and a mirror diameter of 20 cm. The distance between the first mirror 10 and the second mirror 20 is 13.8 cm. During testing, the material M is located near the maximum field of the first mirror 10, and a microwave power of 50 watts is input (about 5% of a conventional closed action chamber). The heating effect is noticeable. The heating effect is indicated by placing a thin liquid crystal plate close to the quasi-optical action chamber, and actuating a $TEM_{0,0,13}$ mode at a frequency of 34.6 GHz through a low power microwave in the quasi-optical action chamber. The thin liquid crystal plate is heated to different temperatures in different fields, and generates different colors to show field profiles. When the microwave source 60 of 1000 watts and 24.5 GHz is used, several dozen square centimeters of material can be treated simultaneously, and mass production is achievable. The simulation and experiment shown in FIGS. 5 and 6 have matching field profiles. They also show that the field profiles close to the first mirror 10 do not display subtle color alteration because the field is weaker.

Because the quasi-optical action chamber formed by the first mirror 10 and the second mirror 20 of the invention has a higher quality factor value and a stronger focusing power, the material to be treated M can be treated in the focusing zone A of a high field. Heating speed is much faster than the conventional high temperature furnace and closed microwave action chamber.

Moreover, the quasi-optical action chamber of the invention provides another advantage, namely that the material to be treated M can pass continuously in the open space between the first mirror 10 and the second mirror 20. Hence the quantity of the material to be treated M is not restricted by the size of the quasi-optical action chamber. In addition, every portion of the material to be treated M is exposed to the same focusing zone A sequentially in the same manner, hence the material may be treated evenly. Any surface size can be treated continuously by scanning in two dimensions. Therefore, when the material to be treated M is a structure of multiple layers, the dense and fine surface that requires high temperature treatment or interfaces that require high temperature fusion may be sprayed with a substance of a high wave absorption coefficient, then a fine and dense structure or fusion can be formed rapidly, while the layers of the lower melting point still remain below the melting temperature.

Figure 4:
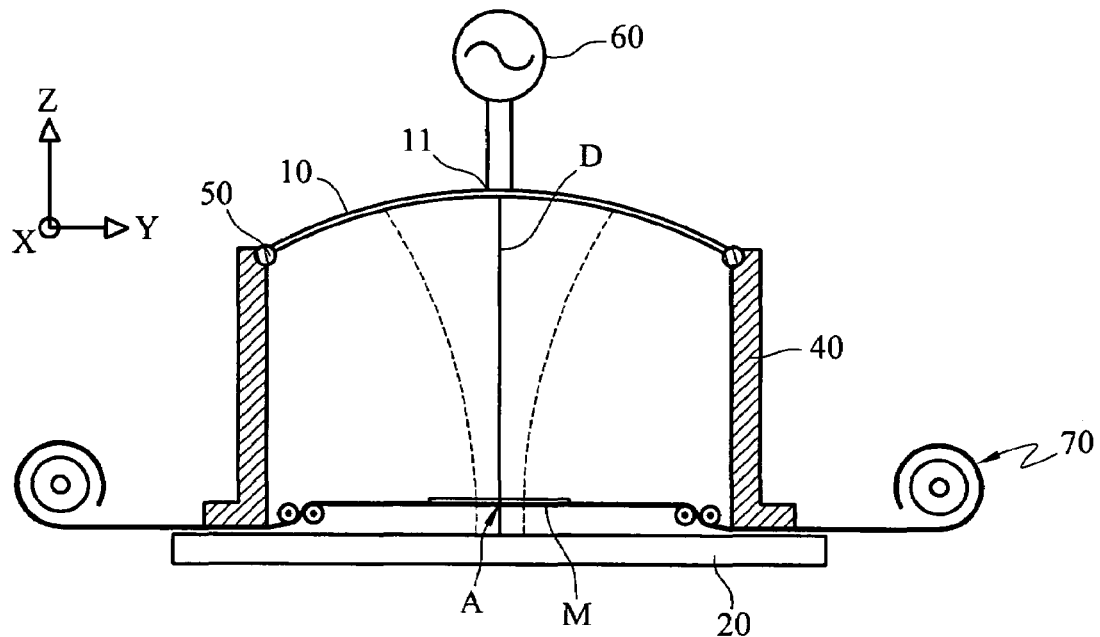
FIG. 4 is a schematic view of the structure of a third embodiment of the invention.

Refer to FIG. 4 for a third embodiment of the invention. It mainly includes a first mirror 10, a second mirror 20 and a moving platform 70. The first mirror 10 is arched, and has a focal point F1 in the chamber distance D, and a coupling port 11 to receive a high power microwave from an external microwave source 60 formed in a horn-shaped antenna. The microwave passes through the coupling port 11 along the chamber distance D (the Z axis shown in the drawing) to output a strong field microwave beam, which forms a Gaussian distribution in the X-Y directions. The second mirror 20 is a plane mirror abutting a focusing zone A of the chamber distance D. The second mirror 20 allows the moving platform 70 to be movably mounted thereon. A material to be treated M (such as semiconductor chips, dielectric materials or the like) is held on the moving platform 70, so that when the material M passes through the focusing zone A of the strong field microwave beam, it can receive heat treatment rapidly and evenly. The invention can treat material M of a large area and size. The first mirror 10 and the second mirror 20 jointly form the quasi-optical action chamber, and are movable relative to each other to adjust the total length of the chamber distance D between them to form the focusing zone A.

To prevent most of the strong field microwave beam from leaking out the apparatus of the invention, a microwave shield 40 may be added to cover the gap between the first mirror 10 and the second mirror 20. The microwave shield 40 may be a structure formed by hollow plastics or glass, and filled with water or salt solution to achieve a higher microwave attenuation effect. The microwave shield 40 may also be a metal cover upon which is attached a solid wave absorbing material. The gap between the shield 40 and the first mirror 10, and between the shield 40 and the second mirror 20 may be padded by a wave absorbing element 50 (or a wave-resistant structure) to prevent the strong field microwave beam from leaking out.

Thus in the third embodiment, plane type material M can be loaded onto the moving platform 70, which is movably mounted onto the second mirror 20. When the material M passes through the focusing zone A of the strong field microwave beam in the chamber distance D, it can be treated as desired.

Of course, the first mirror 10 also may be substituted by a spherical mirror in the third embodiment.

Figure 7A:
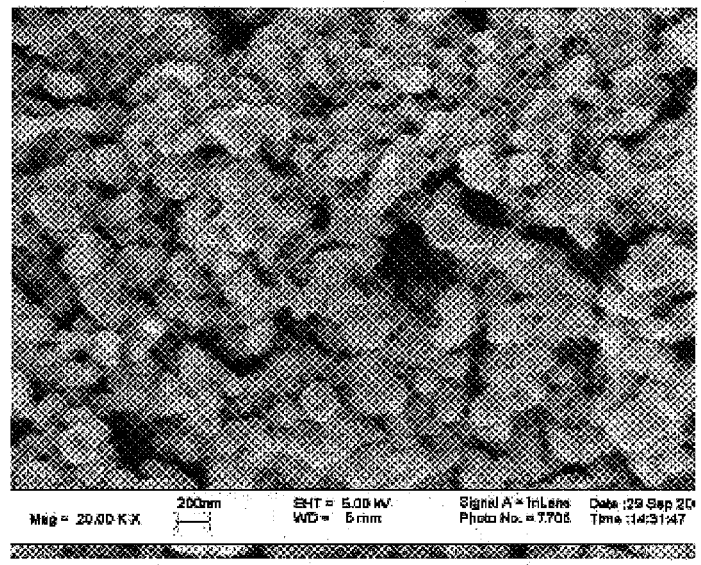
FIGS. 7A and 7B are pictures of the microstructure of the material of the third embodiment before and after treatment.
Figure 7B:
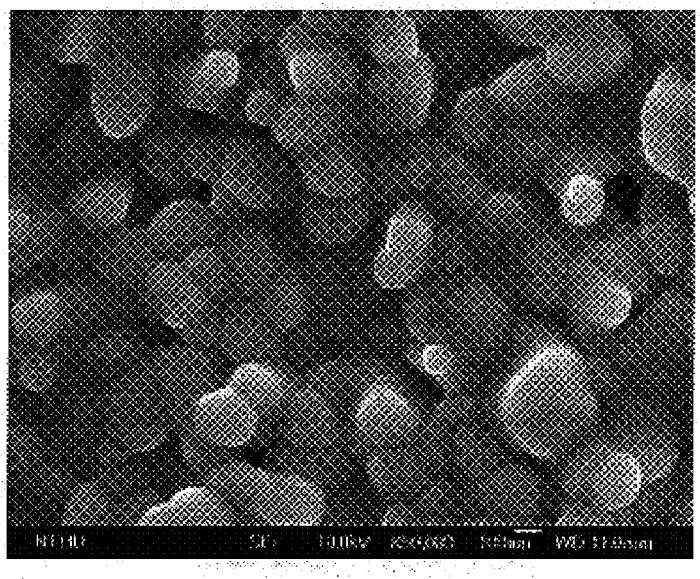

Refer to FIGS. 7A and 7B for the microstructure of the material of the third embodiment before and after treatment. The material to be treated M contains an organic substrate of a low melting temperature, such as polyimide deposited with a layer of material that requires high temperature heat treatment such as lead zirconate titanate (PZT) ceramic film. FIG. 7A shows the material before being treated by the quasi-optical material treatment apparatus. The material M contains loose ceramic granules. After being treated by the microwave of 100 W at 35 GHz for ten minutes, the material forms a fine and dense structure of lead zirconate titanate (PZT) ceramic film shown in FIG. 7B.

Because the quasi-optical action chamber formed by the first mirror 10 and the second mirror 20 of the invention has a higher quality factor value and a stronger focusing power, the material to be treated M can be treated in the focusing zone A of a high field. Heating speed is much faster than the conventional high temperature furnace and closed microwave action chamber.

Moreover, the quasi-optical action chamber has another advantage, namely that the material to be treated M can continuously pass through the open space between the first mirror 10 and the second mirror 20. Thus the quantity of the material to be treated M is not restricted by the size of the quasi-optical resonator. In addition, every portion of the material to be treated M is exposed to the same focusing zone A sequentially in the same manner, hence the material can be treated evenly. Any surface size can be treated continuously by scanning in two dimensions. Therefore, when the material to be treated M is a structure of multiple layers, the dense and fine surfaces that require high temperature treatment or interfaces that require high temperature fusion may be sprayed with a substance of a high wave absorption coefficient, then a fine and dense structure or fusion can be formed rapidly, while the layers of lower melting point still remain below the melting temperature.

The first mirror 10 and the second mirror 20 used in the invention may be designed in a form according to the treatment method required by the material to be treated M. Besides the spherical and plane shapes previously discussed, other curved surfaces and non-curved surfaces may also be used.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A quasi-optical material treatment apparatus, comprising:
   an external microwave source producing high power microwaves;
   a first mirror, formed in an arched shape, the first mirror having a focal point in a chamber distance and a coupling port for receiving said high power microwave passing through the coupling port and traveling along the chamber distance to output a strong field microwave beam; and
   a second mirror, jointly forming a quasi-optical action chamber with the first mirror, the second mirror being movable relative to the first mirror to adjust a total chamber distance therebetween; to generate a focusing zone of the strong field microwave beam, the second mirror abutting the focusing zone and being planar for placing a material passed through the focusing zone of the strong field microwave beam, where the being treated material is movable in two dimensions.

2. The quasi-optical material treatment apparatus of claim 1, wherein the first mirror is spherical.

3. The quasi-optical material treatment apparatus of claim 1, further including a microwave shield to cover a gap formed between the first mirror and the second mirror to prevent the strong field microwave beam from leaking.

4. The quasi-optical material treatment apparatus of claim 3, wherein the microwave shield is hollow and made from transparent plastics or glass, and filled with water or salt solution.

5. The quasi-optical material treatment apparatus of claim 3, wherein the microwave shield is a metal cover attached to a solid wave absorbing material.

6. The quasi-optical material treatment apparatus of claim 3, further including a wave absorbing element located in a gap between the microwave shield and the first mirror, and another gap between the microwave shield and the second mirror to prevent the strong field microwave beam from leaking.

7. The quasi-optical material treatment apparatus of claim 3, further including a wave resistant structure located in a gap between the microwave shield and the first mirror, and another gap between the microwave shield, and the second mirror to prevent the strong field microwave beam from leaking.

8. The quasi-optical material treatment apparatus of claim 1, wherein the material to be treated is planar.

9. The quasi-optical material treatment apparatus of claim 1, wherein the material to be treated is a semiconductor chip.

10. The quasi-optical material treatment apparatus of claim 1, wherein the material to be treated is a dielectric material.

11. The quasi-optical material treatment apparatus of claim 1, wherein the microwave source is a horn-shaped antenna.

* * * * *